United States Patent
Somani et al.

(10) Patent No.: US 12,339,835 B2
(45) Date of Patent: Jun. 24, 2025

(54) SYSTEM, METHOD, AND APPARATUS FOR IMPLEMENTING A BLOCKCHAIN-BASED REWARDS NETWORK

(71) Applicant: Visa International Service Association, San Francisco, CA (US)

(72) Inventors: Anil Somani, San Jose, CA (US); Mohamed Nosseir, Castro Valley, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/241,574

(22) Filed: Sep. 1, 2023

(65) Prior Publication Data

US 2023/0409564 A1 Dec. 21, 2023

Related U.S. Application Data

(63) Continuation of application No. 16/629,152, filed as application No. PCT/US2017/041001 on Jul. 7, 2017, now Pat. No. 11,782,902.

(51) Int. Cl.
*G06F 16/23* (2019.01)
(52) U.S. Cl.
CPC .................. *G06F 16/2379* (2019.01)
(58) Field of Classification Search
CPC ............ G06F 16/2379; G06F 16/9024; G06Q 2220/00; G06Q 20/387; G06Q 20/06; G06Q 20/36; H04L 9/50
See application file for complete search history.

(56) References Cited

U.S. PATENT DOCUMENTS

| | | |
|---|---|---|
| 9,405,929 B1 | 8/2016 | Van Rotterdam et al. |
| 2004/0117392 A1* | 6/2004 | Burgmeier .............. G06F 16/25 |
| 2008/0059302 A1* | 3/2008 | Fordyce, III ....... G06Q 30/0211 |
| | | 705/14.27 |

(Continued)

FOREIGN PATENT DOCUMENTS

| | | |
|---|---|---|
| WO | 2017066002 A1 | 4/2017 |
| WO | 2017112664 A1 | 6/2017 |

OTHER PUBLICATIONS

"Blockchain (database)—Wikipedia", Dec. 2015, pp. 1-5. Retrieved from https://en.wikipedia.org/w/ i ndex.php?title=Blockchain_(database)Soldid=696261810.

(Continued)

*Primary Examiner* — Charles D Adams
(74) *Attorney, Agent, or Firm* — The Webb Law Firm

(57) ABSTRACT

Provided is a computer-implemented method for implementing a blockchain-based rewards network. The method includes establishing a blockchain network including administrative nodes, client nodes, and entity nodes, maintaining a distributed ledger on at least a portion of the administrative nodes of the blockchain network, receiving, from a plurality of entities, rewards data including a plurality of offers, each offer of the plurality of offers corresponding to at least one entity identifier, publishing the rewards data to the distributed ledger, querying the distributed ledger based on at least one entity identifier received from a client node, and determining, based on the distributed ledger, at least one offer corresponding to the at least one entity identifier received from the client node.

17 Claims, 7 Drawing Sheets

(56) References Cited

U.S. PATENT DOCUMENTS

| | | | |
|---|---|---|---|
| 2012/0004973 A1* | 1/2012 | Postrel | G06Q 30/0226 |
| | | | 705/14.27 |
| 2013/0159084 A1 | 6/2013 | Smith et al. | |
| 2015/0170112 A1 | 6/2015 | DeCastro | |
| 2015/0294308 A1 | 10/2015 | Pauker et al. | |
| 2015/0363768 A1 | 12/2015 | Melika et al. | |
| 2016/0342989 A1 | 11/2016 | Davis | |
| 2016/0342994 A1 | 11/2016 | Davis | |
| 2017/0017958 A1 | 1/2017 | Scott et al. | |
| 2017/0091766 A1 | 3/2017 | Venugopalan et al. | |
| 2017/0140375 A1 | 5/2017 | Kunstel | |
| 2017/0178128 A1 | 6/2017 | Fourez et al. | |
| 2017/0237554 A1 | 8/2017 | Jacobs et al. | |
| 2018/0285879 A1 | 10/2018 | Gadnis et al. | |
| 2018/0300741 A1* | 10/2018 | Leonard | G06Q 30/08 |
| 2018/0308134 A1 | 10/2018 | Manning et al. | |

OTHER PUBLICATIONS

Buterin, "On Public and Private Blockchains", Aug. 2016, pp. 1-6. Retrieved from https://blog.ethereum.org/2015/08/07/on-public-and-private-blockchains/.

"Distributed Ledger Technology & Cybersecurity13 Improving information security in the financial sector", Jan. 2017, pp. 1-36. Retrieved from https://www.enisa.europa.eu/publications/blockchain-security.

Hoefler et al., "Credit card metadata database", Open Data Stack Exchange, Mar. 2017, pp. 1-3. Retrieved from https://web.archive.org/web/20170317041521/https://opendata.stackexchange.com/questions/3930/credit-card-metadata-database.

* cited by examiner

Entity View

| Entity View | Client View |
|---|---|

HNB (Heidrun National Bank) ▼ — 304

| BIN | MCC | Issuer | Description | Campaign Code | Status |
|---|---|---|---|---|---|
| 472196 | AIRLINES | HNB (Heidrun National Bank) | Get free insurance on your fare when you use your FDNB card | FREE_INS | active ⊠ |
| 472196 | DINING | HNB (Heidrun National Bank) | Double your points when you use your FDNB card for dining | POINTSX2 | active ⊠ |
| 472196 | DINING | HNB (Heidrun National Bank) | On Valentine day, double your points when you use your FNB card to buy flowers | POINTSX2 | active ⊠ |
| 472196 | FITNESS | HNB (Heidrun National Bank) | Get a free subscription to a fitness magazine month with your FDNB card for your gym fees | FREE_MAG | active ⊠ |
| 472196 | FUEL | HNB (Heidrun National Bank) | Double your points when you use your FDNB card at the pump | POINTSX2 | active ⊠ |
| 472196 | CAR_RENTAL | HNB (Heidrun National Bank) | Get free insurance on your car rental when you use your FDNB card | FREE_INS | active ⊠ |
| 472196 | TRANSPORT | HNB (Heidrun National Bank) | Double your points when you use your FDNB card for transportation services | POINTSX2 | active ⊠ |
| 472196 | HOTELS | HNB (Heidrun National Bank) | Get free parking when you book with your FDNB card | PARK_FREE | active ⊠ |

Create... — 303

FIG. 3A

Entity View

HNB (Heidrun National Bank) ▼

| BIN | MCC | Issuer | Desc |
|---|---|---|---|
| 472196 | AIRLINES | HNB (Heidrun National Bank) | Get f... |
| 472196 | DINING | HNB (Heidrun National Bank) | Doub... |
| 472196 | DINING | HNB (Heidrun National Bank) | On V... |
| 472196 | FITNESS | HNB (Heidrun National Bank) | Get ... |
| 472196 | FUEL | HNB (Heidrun National Bank) | Doub... |
| 472196 | CAR_RENTAL | HNB (Heidrun National Bank) | Get f... |
| 472196 | TRANSPORT | HNB (Heidrun National Bank) | Doub... |
| 472196 | HOTELS | HNB (Heidrun National Bank) | Get f... |

Create...

Campaign Table (302)

| Description | Campaign Code | Status | |
|---|---|---|---|
| ...rd | FREE_INS | active | ✕ |
| | POINTSX2 | active | ✕ |
| ...r FDNB card to buy flowers | POINTSX2 | active | ✕ |
| ...our FDNB card for your gym fees | FREE_MAG | active | ✕ |
| ...mp | POINTSX2 | active | ✕ |
| ...NB card | FREE_INS | active | ✕ |
| ...ortation services | POINTSX2 | active | ✕ |
| | PARK_FREE | active | ✕ |

Enter Your Campaign's Data (312)

Issuer: HNB (Heidrun National Bank)
BIN:
MCC:
Campain Code:
Description:

[Create...] (326)  [Close...] (324)

FIG. 3B

Entity View | Client View

Client (Checkout Provider) View 307

WORLD_PAY (World Pay) ▼

| BIN | MCC | Issuer | Description | Campaign Code | Status |
|---|---|---|---|---|---|
| 490214 | AIRLINES | TECH_CU (Tech Credit Union) | Get free insurance on your fare when you use your FDNB card | FREE_INS | active |
| 467439 | AIRLINES | FDNB (First Digital National Bank) | Get free insurance on your fare when you use your FDNB card | FREE_INS | active |
| 467439 | FITNESS | FDNB (First Digital National Bank) | Get a free subscription to a fitness magazine month with your FDNB card for your gym fees | FREE_MAG | active |
| 467439 | FLOWERS | TECH_CU (Tech Credit Union) | On Valetine day, double your points when you use your FNB card to buy flowers | POINTSX2 | active |
| 490214 | DINING | TECH_CU (Tech Credit Union) | Double your points when you use your FDNB card for dining | POINTSX2 | active |
| 472196 | AIRLINES | HNB (Heidrun National Bank) | Get free insurance on your fare when you use your FDNB card | FREE_INS | active |
| 472196 | DINING | HNB (Heidrun National Bank) | Double your points when you use your FDNB card for dining | POINTSX2 | active |
| 472196 | FLOWERS | HNB (Heidrun National Bank) | In Valetine day, double your points when you use your FNB card to buy flowers | POINTSX2 | active |
| 467439 | CAR_RENTAL | FDNB (First Digital National Bank) | Get free insurance on your car rental when you use your FDNB card | FREE_INS | active |
| 490214 | CAR_RENTAL | TECH_CU (Tech Credit Union) | Get free insurance on your car rental when you use your FDNB card | FREE_INS | active |
| 467439 | TRANSPORT | FDNB (First Digital National Bank) | Double your points when you use your FDNB card for transportation services | POINTSX2 | active |
| 490214 | FITNESS | TECH_CU (Tech Credit Union) | Get a free subscription to a fitness magazine month with your FDNB card for your gym fees | FREE_MAG | active |
| 472196 | FITNESS | HNB (Heidrun National Bank) | Get a free subscription to a fitness magazine month with your FDNB card for your gym fees | FREE_MAG | active |
| 490214 | FUEL | TECH_CU (Tech Credit Union) | Double your points when you use your FDNB card at the pump | POINTSX2 | active |
| 490214 | TRANSPORT | TECH_CU (Tech Credit Union) | Double your points when you use your FDNB card for transportation services | POINTSX2 | active |

FIG. 3C

SYSTEM, METHOD, AND APPARATUS FOR IMPLEMENTING A BLOCKCHAIN-BASED REWARDS NETWORK

CROSS-REFERENCE TO RELATED APPLICATIONS

This application is a continuation of U.S. patent application Ser. No. 16/629,152 filed Jul. 7, 2017, which is the United States national phase of International Application No. PCT/US2017/041001 filed Jul. 7, 2017, the disclosures of which are hereby incorporated by reference in their entireties.

BACKGROUND

1. Technical Field

This disclosure relates generally to blockchain networks and, in some non-limiting embodiments or aspects, to a system, method, and apparatus for implementing a blockchain-based rewards network.

2. Technical Considerations

Issuer institutions that provide portable financial devices to users often provide loyalty programs to incentivize the users to conduct transactions using a portable financial device issued by that particular issuer institution. For example, an issuer institution may provide traveler insurance to users that conduct travel-related transactions with their portable financial devices. As another example, an issuer institution may provide offers, such as discounts, cash, and/or other rewards, to users. The offers provided by issuer institutions may be based on one or more specified merchants, merchant categories, and temporary promotions, as examples.

Users having multiple portable financial devices from multiple issuer institutions must be aware of the different offers and rules governing such offers in order to benefit from the issuer institutions' loyalty programs. Existing solutions to this problem rely on individual entities or systems storing loyalty program information, such as by an electronic wallet application, which may not be updated or accurate. Issuer institutions must interface with multiple different systems and entities to maintain updated and accurate loyalty program information, which is technically infeasible. Accordingly, there is a need for a technically improved architecture of a rewards network to recommend a portable financial device to a user for a given transaction or situation.

SUMMARY

Accordingly, provided are improved systems, methods, and apparatus for implementing a blockchain-based rewards network.

According to some non-limiting embodiments or aspects, provided is a computer-implemented method for implementing a blockchain-based rewards network, comprising: establishing, with at least one processor, a blockchain network comprising administrative nodes, client nodes, and entity nodes; maintaining, with at least one processor, a distributed ledger on at least a portion of the administrative nodes of the blockchain network; receiving, from a plurality of entities, rewards data comprising a plurality of offers, each offer of the plurality of offers corresponding to at least one entity identifier; publishing, with at least one processor, the rewards data to the distributed ledger; querying, with at least one processor, the distributed ledger based on at least one entity identifier received from a client node; and determining, with at least one processor and based on the distributed ledger, at least one offer corresponding to the at least one entity identifier received from the client node.

In some non-limiting embodiments or aspects, each offer of the plurality of offers corresponds to at least one merchant identifier. Further, the distributed ledger may be queried based on the at least one entity identifier received from the client node and a merchant identifier of the plurality of merchant identifiers, and the at least one offer may correspond to a combination of the at least one entity identifier and the merchant identifier. The method may also include, in some non-limiting embodiments or aspects, determining, with at least one processor, a geolocation of the client node; and determining, with at least one processor, the merchant identifier based at least partially on the geolocation of the client node. The method may also include, in some non-limiting embodiments or aspects, establishing permissions for each of the administrative nodes, client nodes, and entity nodes. In some examples, only the administrative nodes may have permission to assign entity identifiers to entities, only the entity nodes may have permission to create, modify, and/or delete rewards data published to the distributed ledger, and/or only the client nodes may have permission to query the distributed ledger. In some non-limiting embodiments or aspects, at least one client node comprises a mobile device executing a mobile wallet application, and the querying may be performed based on a plurality of entity identifiers stored in the mobile wallet application.

According to some non-limiting embodiments or aspects, provided is a computer program product for implementing a blockchain-based rewards network, comprising at least one computer-readable medium including program instructions that, when executed by at least one processor, cause the at least one processor to: establish a blockchain network comprising administrative nodes, client nodes, and entity nodes; maintain a distributed ledger on at least a portion of the administrative nodes of the blockchain network; receive rewards data comprising a plurality of offers, each offer of the plurality of offers corresponding to at least one entity identifier; publish the rewards data to the distributed ledger; query the distributed ledger based on at least one entity identifier received from a client node; and determine, based on the distributed ledger, at least one offer corresponding to the at least one entity identifier received from the client node.

In some non-limiting embodiments or aspects, each offer of the plurality of offers corresponds to at least one merchant identifier. Further, the distributed ledger may be queried based on the at least one entity identifier received from the client node and a merchant identifier of the plurality of merchant identifiers, and the at least one offer may correspond to a combination of the at least one entity identifier and the merchant identifier.

In some non-limiting embodiments or aspects, the program instructions, when executed by the at least one processor, further cause the at least one processor to determine a geolocation of the client node; and determine the merchant identifier based at least partially on the geolocation of the client node. In some non-limiting embodiments or aspects, the program instructions, when executed by the at least one processor, further cause the at least one processor to establish permissions for each of the administrative nodes, client nodes, and entity nodes. In some examples, only the administrative nodes may have permission to assign entity identifiers to entities, only the entity nodes may have permission to create, modify, and/or delete rewards data published to the distributed ledger, and/or only the client nodes may have permission to query the distributed ledger. In some non-limiting embodiments or aspects, at least one client node comprises a mobile device executing a mobile wallet application, and the querying may be performed based on a plurality of entity identifiers stored in the mobile wallet application.

According to some non-limiting embodiments or aspects, provided is a blockchain-based rewards network, comprising: (a) a plurality of administrative nodes, each administrative node of the plurality of administrative nodes programmed or configured to: (i) host a distributed ledger, and (ii) assign entity identifiers to entity nodes; (b) a plurality of entity nodes, each entity node of the plurality of entity nodes programmed or configured to create, modify, and/or delete rewards data published to the distributed ledger hosted by the plurality of administrative nodes, the rewards data comprising a plurality of offers, each offer of the plurality of offers corresponding to at least one entity identifier; and (c) a plurality of client nodes, each client node of the plurality of client nodes programmed or configured to: (i) query the distributed ledger based on at least one entity identifier, and (ii) receive at least one offer corresponding to the at least one entity identifier in response to the query.

In some non-limiting embodiments or aspects, each offer of the plurality of offers corresponds to at least one merchant identifier. Further, each client node of the plurality of client nodes may be programmed or configured to query the distributed ledger based on the at least one entity identifier received from the client node and a merchant identifier of the plurality of merchant identifiers, and the at least one offer may correspond to a combination of the at least one entity identifier and the merchant identifier. In some examples, only the administrative nodes may have permission to assign entity identifiers to entities, only the entity nodes may have permission to create, modify, and/or delete rewards data published to the distributed ledger, and/or only the client nodes may have permission to query the distributed ledger.

According to some non-limiting embodiments or aspects, provided is a computer-implemented method for implementing a blockchain-based rewards network, comprising: establishing, with at least one processor, a blockchain network comprising administrative nodes, client nodes, and issuer nodes; maintaining, with at least one processor, a distributed ledger on at least a portion of the administrative nodes of the blockchain network; receiving, from a plurality of offer-providers, rewards data comprising a plurality of offers, each offer of the plurality of offers corresponding to at least one issuer identifier; publishing, with at least one processor, the rewards data to the distributed ledger; querying, with at least one processor, the distributed ledger based on at least one issuer identifier received from a client node; and determining, with at least one processor and based on the distributed ledger, at least one offer corresponding to the at least one issuer identifier received from the client node.

Further non-limiting embodiments or aspects are set forth in the following numbered clauses.

Clause 1: A computer-implemented method for implementing a blockchain-based rewards network, comprising: establishing, with at least one processor, a blockchain network comprising administrative nodes, client nodes, and entity nodes; maintaining, with at least one processor, a distributed ledger on at least a portion of the administrative nodes of the blockchain network; receiving, from a plurality of entities, rewards data comprising a plurality of offers, each offer of the plurality of offers corresponding to at least one entity identifier; publishing, with at least one processor, the rewards data to the distributed ledger; querying, with at least one processor, the distributed ledger based on at least one entity identifier received from a client node; and determining, with at least one processor and based on the distributed ledger, at least one offer corresponding to the at least one entity identifier received from the client node.

Clause 2: The computer-implemented method of clause 1, wherein each offer of the plurality of offers corresponds to at least one merchant identifier.

Clause 3: The computer-implemented method of any of clauses 1-2, wherein the distributed ledger is queried based on the at least one entity identifier received from the client node and a merchant identifier of the plurality of merchant identifiers, and wherein the at least one offer corresponds to a combination of the at least one entity identifier and the merchant identifier.

Clause 4: The computer-implemented method of any of clauses 1-3, further comprising: determining, with at least one processor, a geolocation of the client node; and determining, with at least one processor, the merchant identifier based at least partially on the geolocation of the client node.

Clause 5: The computer-implemented method of any of clauses 1-4, further comprising establishing permissions for each of the administrative nodes, client nodes, and entity nodes.

Clause 6: The computer-implemented method of any of clauses 1-5, wherein only the administrative nodes have permission to assign entity identifiers to entities.

Clause 7: The computer-implemented method of any of clauses 1-6, wherein only the entity nodes have permission to create, modify, and/or delete rewards data published to the distributed ledger.

Clause 8: The computer-implemented method of any of clauses 1-7, wherein only the client nodes have permission to query the distributed ledger.

Clause 9: The computer-implemented method of any of clauses 1-8, wherein at least one client node comprises a mobile device executing a mobile wallet application, and wherein the querying is performed based on a plurality of entity identifiers stored in the mobile wallet application.

Clause 10: A computer program product for implementing a blockchain-based rewards network, comprising at least one computer-readable medium including program instructions that, when executed by at least one processor, cause the at least one processor to: establish a blockchain network comprising administrative nodes, client nodes, and entity nodes; maintain a distributed ledger on at least a portion of the administrative nodes of the blockchain network; receive rewards data comprising a plurality of offers, each offer of the plurality of offers corresponding to at least one entity identifier; publish the rewards data to the distributed ledger; query the distributed ledger based on at least one entity identifier received from a client node; and determine, based on the distributed ledger, at least one offer corresponding to the at least one entity identifier received from the client node.

Clause 11: The computer program product of clause 10, wherein each offer of the plurality of offers corresponds to at least one merchant identifier.

Clause 12: The computer program product of any of clauses 10-11, wherein the distributed ledger is queried based on the at least one entity identifier received from the client node and a merchant identifier of the plurality of merchant identifiers, and wherein the at least one offer corresponds to a combination of the at least one entity identifier and the merchant identifier.

Clause 13: The computer program product of any of clauses 10-12, wherein the program instructions, when executed by the at least one processor, further cause the at least one processor to: determine a geolocation of the client node; and determine the merchant identifier based at least partially on the geolocation of the client node.

Clause 14: The computer program product of any of clauses 10-13, wherein the program instructions, when executed by the at least one processor, further cause the at least one processor to establish permissions for each of the administrative nodes, client nodes, and entity nodes.

Clause 15: The computer program product of any of clauses 10-14, wherein only the administrative nodes have permission to assign entity identifiers to entities.

Clause 16: The computer program product of any of clauses 10-15, wherein only the entity nodes have permission to create, modify, and/or delete rewards data published to the distributed ledger.

Clause 17: The computer program product of any of clauses 10-16, wherein only the client nodes have permission to query the distributed ledger.

Clause 18: The computer program product of any of clauses 10-17, wherein at least one client node comprises a mobile device executing a mobile wallet application, and wherein the querying is performed based on a plurality of entity identifiers stored in the mobile wallet application.

Clause 19: A blockchain-based rewards network, comprising: (a) a plurality of administrative nodes, each administrative node of the plurality of administrative nodes programmed or configured to: (i) host a distributed ledger, and (ii) assign entity identifiers to entity nodes; (b) a plurality of entity nodes, each entity node of the plurality of entity nodes programmed or configured to create, modify, and/or delete rewards data published to the distributed ledger hosted by the plurality of administrative nodes, the rewards data comprising a plurality of offers, each offer of the plurality of offers corresponding to at least one entity identifier; and (c) a plurality of client nodes, each client node of the plurality of client nodes programmed or configured to: (i) query the distributed ledger based on at least one entity identifier, and (ii) receive at least one offer corresponding to the at least one entity identifier in response to the query.

Clause 20: The blockchain-based rewards network of clause 19, wherein each offer of the plurality of offers corresponds to at least one merchant identifier.

Clause 21: The blockchain-based rewards network of any of clauses 19-20, wherein each client node of the plurality of client nodes programmed or configured to query the distributed ledger based on the at least one entity identifier received from the client node and a merchant identifier of the plurality of merchant identifiers, and wherein the at least one offer corresponds to a combination of the at least one entity identifier and the merchant identifier.

Clause 22: The blockchain-based rewards network of any of clauses 19-21, wherein only the plurality of administrative nodes have permission to assign entity identifiers to entities.

Clause 23: The blockchain-based rewards network of any of clauses 19-22, wherein only the entity nodes have permission to create, modify, and/or delete rewards data published to the distributed ledger.

Clause 24: The blockchain-based rewards network of any of clauses 19-23, wherein only the plurality of client nodes have permission to query the distributed ledger.

Clause 25: A computer-implemented method for implementing a blockchain-based rewards network, comprising: establishing, with at least one processor, a blockchain network comprising administrative nodes, client nodes, and issuer nodes; maintaining, with at least one processor, a distributed ledger on at least a portion of the administrative nodes of the blockchain network; receiving, from a plurality of offer-providers, rewards data comprising a plurality of offers, each offer of the plurality of offers corresponding to at least one issuer identifier; publishing, with at least one processor, the rewards data to the distributed ledger; querying, with at least one processor, the distributed ledger based on at least one issuer identifier received from a client node; and determining, with at least one processor and based on the distributed ledger, at least one offer corresponding to the at least one issuer identifier received from the client node These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 3A is a graphical user interface for use in a system for implementing a blockchain-based rewards network according to some non-limiting embodiments or aspects;

FIG. 3B is another graphical user interface for use in a system for implementing a blockchain-based rewards network according to some non-limiting embodiments or aspects;

FIG. 3C is a further graphical user interface for use in a system for implementing a blockchain-based rewards network according to some non-limiting embodiments or aspects;

DETAILED DESCRIPTION

Figure 1:
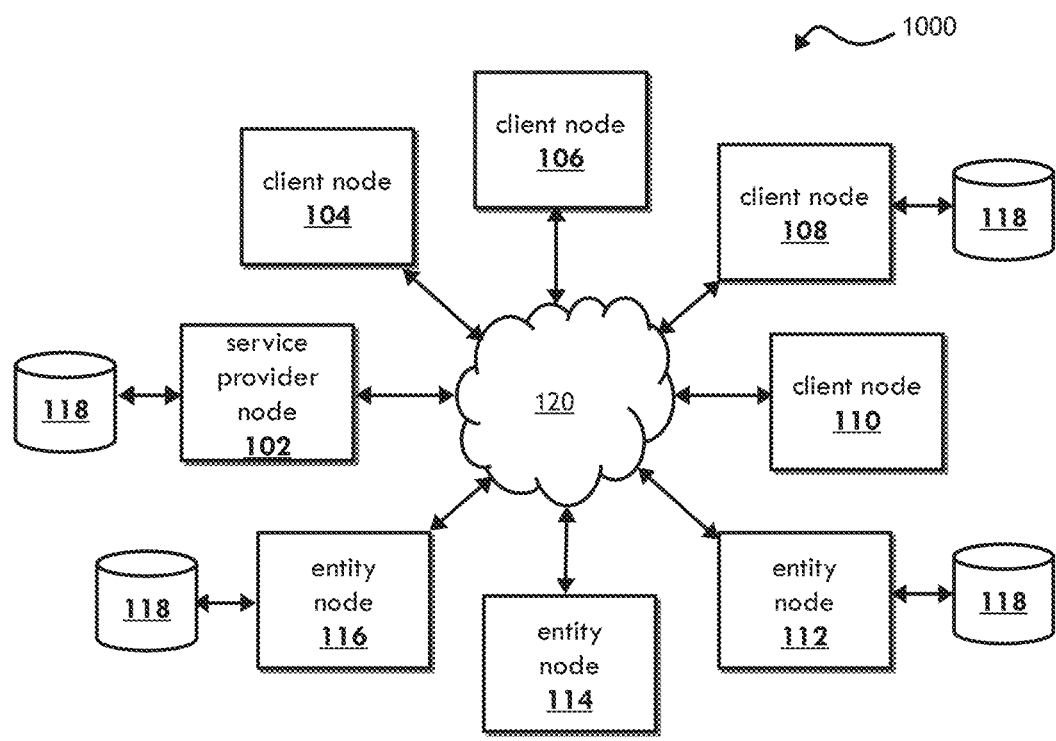
FIG. 1 is a schematic diagram of a system for implementing a blockchain-based rewards network according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a system, method, and computer program product for implementing a blockchain-based rewards network for recommending a portable financial device or an available offer to a user for a given transaction or situation. As an example, a user anticipating or initiating a financial transaction at a merchant may be identified and provided with a recommended portable financial device of a plurality of portable financial devices held by that user, such that that recommended portable financial device provides an offer when used at that merchant and/or for that transaction. As another example, a user in a particular geographic location may be identified and provided with a recommended portable financial device to receive an offer at that location that does not require a transaction, such as admittance into a facility or establishment. The portable financial device may be recommended based on a maximum reward receivable to the user and/or based on other user-specified or automated preference rules. In some examples, a user may be presented with a plurality of recommendations to choose from. Non-limiting embodiments are directed to a unique and technologically improved permission-based blockchain network architecture to implement such a rewards network. By utilizing blockchain technologies and by maintaining permissions for different participants in the blockchain network, a technologically improved network architecture is provided that allows for transparency, consistency, and ease of use by all participants.

Because data maintained in the blockchain network is available to all participants of the blockchain having permission to access the data, users can easily obtain rewards data for any portable financial device at any given time. The transparency of a blockchain network also prevents inconsistency and fraudulent activity among the participants. Moreover, since a single blockchain may store rewards data for multiple portable financial devices, regardless of the issuer institution or transaction service provider, merchants and electronic wallet providers can easily provide such rewards data to consumers and integrate such rewards data into merchant systems and/or electronic wallet applications.

As used herein, the term "transaction service provider" may refer to an entity that receives transaction authorization requests from merchants or other entities and provides guarantees of payment, in some cases through an agreement between the transaction service provider and an issuer institution. The term "transaction service provider" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a primary account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

Referring now to FIG. 1, a schematic diagram of a system 1000 for implementing a blockchain-based rewards network is shown according to some non-limiting embodiments or aspects. The system 1000 includes a service provider node 102, client nodes 104, 106, 108, 110, and entity nodes 112, 114, 116. The nodes may be in communication via one or more network environments 120, such as the Internet, a private network, and/or the like. It will be appreciated that various numbers of service provider nodes, client nodes, and entity nodes may be included in the system 1000 and that the system 1000 may also include nodes of different types. In FIG. 1, the service provider node 102, entity node 116, entity node 112, and client node 108 host a distributed ledger 118. The distributed ledger 118 may be hosted by any number of nodes in the system 1000.

As used herein, the term "node" refers to one or more computing devices in communication with other computing devices via one or more network environments. Each participant in the blockchain network may be associated with a node. In some examples, only certain nodes and/or types of nodes (e.g., client, entity, service provider, etc.) may host a distributed ledger 118. Nodes that host the distributed ledger 118 may be referred to herein as "full nodes." An "administrative node" may be a client node, an entity node, a service provider node, a full node, and/or the like that has the ability to assign permissions to different nodes and/or participants in the system 1000. In some non-limiting embodiments or aspects, service provider nodes 102 may serve as administrative nodes. However, it will be appreciated that various arrangements are possible in which any node may serve as a full node and/or administrative node.

With continued reference to FIG. 1, entity nodes 112, 114, 116 may each be associated with an entity such as an issuer institution. For example, the entity nodes 112, 114, 116 may be different issuer systems corresponding respectively to different issuer institutions. However, it will be appreciated that the entity nodes may be systems corresponding to any type of different entities. The service provider node 102 may be a transaction service provider system for a transaction service provider, such as a payment network, but could also be any other system corresponding to a service provider. The client nodes 104, 106, 108, 110 may be different merchant systems for different merchants, electronic wallet providers, customers, payment gateways, and/or the like. In some embodiments, the client nodes 104, 106, 108, 110 may be systems associated with checkout providers, such as merchants, electronic wallet providers, payment gateways, and the like. One or more client nodes 104, 106, 108, 110 may also include a mobile device associated with a user.

It will be appreciated that, in some non-limiting embodiments or aspects, the types of nodes may overlap. For example, a node may be both a service provider node and an entity node for a transaction service provider that also acts as an issuer institution. In some non-limiting examples, the blockchain network may not include any service provider nodes and may only include entity nodes and client nodes. Moreover, in some non-limiting embodiments or aspects, other types of nodes and users may be included in the blockchain network. Various other arrangements are possible.

Still referring to FIG. 1, each node 102, 104, 106, 108, 110, 112, 114, 116 may be associated with a unique identifier, such as an entity identifier, a client identifier, a service provider identifier, an administrative identifier, and the like. An entity identifier may identify an entity and include, for example, one or more Bank Identification Numbers (BIN) that identify an issuer institution. A client identifier may identify a client node and include, for example, a merchant identifier, an electronic wallet provider identifier, a user identifier, and/or the like. It will be appreciated that an entity identifier, a client identifier, a service provider identifier, an administrative identifier, and other identifiers may be in any form, such as an alphanumeric string, a number, a network address for the node, and/or the like, and that multiple identifiers may be used.

The blockchain network provides a shared, distributed ledger 118 for recording the history of transactions or other information, allowing for consistency, accountability, and transparency. The blockchain network allows for transactions to occur and for information to be shared among multiple participants. The blockchain network does not require the use of cryptocurrencies, such as a Bitcoin network, but can instead be implemented with a distributed ledger and various participants without requiring any underlying transactions, processor-intensive problem solving, or other aspects of a cryptocurrency-based blockchain network. In some non-limiting embodiments or aspects, the blockchain network may be implemented with a third-party distributed ledger framework such as IBM Hyperledger Fabric. For example, the blockchain network may be implemented using the IBM Bluemix Fabric cloud-based platform. It will be appreciated, however, that the blockchain network described herein may be implemented in any number of ways and using various frameworks and/or network architectures. For example, non-limiting embodiments of the disclosure may be implemented using a cryptocurrency-based blockchain network.

In some non-limiting embodiments or aspects, each node and/or type of node may be assigned permissions defining how that node can interact with the distributed ledger 118. For example, entity nodes 112, 114, 116 may have permission to publish rewards data to the distributed ledger 118 by creating, modifying, and/or deleting rewards data. In such examples, an entity node may be assigned permission to create a loyalty program associated with one or more BINs or BIN ranges, update a loyalty program that it previously created, delete a loyalty program that it previously created, and/or the like. A loyalty program may include a range of portable financial devices (identified by one or more BINs, as an example) associated with different offers.

As used herein, "rewards data" may refer to any information associated with a loyalty program or any other type of incentive program. For example, rewards data may include one or more parameters and/or rewards rules associated with one or more offers. Such parameters may include a BIN or BIN range, an MCC, a merchant identifier, an issuer institution identifier, a description of a loyalty program, a status of a loyalty program (e.g., active, inactive, etc.), a description of an offer provided through the loyalty program, an offer identifier, a transaction value, a transaction frequency, a geographic location, a time of day, a day of the week, a date, and/or any other parameter associated with a location, a transaction, a merchant, or a user. An offer may include any type of reward such as a benefit, discount, cash-back, free product or service, airline miles, hotel points, and/or the like, receivable by a user.

A rewards rule may include one or more parameters associated with one or more offers such that satisfying the specified parameters qualifies a user for the associated offer(s). For example, a rewards rule may specify a combination of BIN (or BIN range) and MCC that qualifies a user for a reward when a portable financial device having that BIN (or within that BIN range) conducts a transaction at a merchant classified in that MCC. For instance, a certain range of portable financial devices (corresponding to a BIN or BIN range) may be associated with a rewards rule that provides an offer of free insurance when used for a vehicle rental transaction (as identified by an MCC or a merchant identifier, for example). As another example, a rewards rule may include a certain range of portable financial devices (corresponding to a BIN or BIN range) associated with a day of the week and a merchant identifier, such that one or more offers are available if one of those portable financial devices is used to initiate a transaction on a specified day of the week at a specified merchant. A rewards rule may be processed with any available rewards data, transaction data, or other data to determine whether a user of the portable financial device is entitled to one or more offers for conducting a transaction or for presenting the portable financial device to an establishment.

With continued reference to FIG. 1, a client node 106, 108, 110 may have permission to query the distributed ledger 118 based on a portable financial device, account identifier, BIN (which may be part of an account identifier), and/or any other parameter. For example, an electronic wallet provider may query the distributed ledger 118 at the time of a transaction to recommend one or more portable financial devices to the user based at least partially on the BINs associated with the account identifiers registered to the user's electronic wallet. If the user does not have a portable financial device that provides an offer for a given transaction or situation, the user may be prompted to register for such a portable financial device. Similarly, a merchant system, such as a merchant POS system, may query the distributed ledger 118 at the time of a transaction to recommend one or more portable financial devices to the user. A client node may query the distributed ledger 118 based on a particular BIN or account identifier, a combination of a particular BIN or account identifier and an MCC, or with any other like parameters. A client node, in some examples, may not have permission to publish rewards data to the distributed ledger. It will be appreciated that client nodes may be provided with various different permissions for interacting with the distributed ledger 118.

A service provider node 102 may have permission to manage the permissions of other participants in the blockchain network. For example, a service provider node 102 may ensure that an entity node only publishes rewards data for portable financial devices associated with that entity node. A service provider node may also have permission to resolve disputes between client nodes 106, 108, 110 and entity nodes 112, 114, 116. For example, if a consumer or merchant claims a reward that an issuer institution denies, the service provider node 102 may query the distributed ledger to determine whether the requested reward was available to the consumer at the time of the transaction. A service provider node 102 may also have permission to assign BINs to entity nodes 112, 114, 116, such that the entity nodes can only publish rewards data for portable financial devices corresponding to BINs that they were assigned.

An administrative node may have permission to manage the permissions of other participants in the blockchain network. An administrative node may include a service provider node, a client node, an entity node, or any other participant in the blockchain network. In some examples, only administrative nodes may have permission to assign BINs to entity nodes such that the entity nodes can only publish rewards data for portable financial devices corresponding to BINs that they were assigned. In some non-limiting embodiments or aspects, only the service provider node(s) serve as administrative nodes, although other variations are possible.

The blockchain may be queried by any node having permission and based on one or more specified parameters. The query may be generated at the request of a user, at the request of a merchant, and/or at the request of an electronic wallet application, as examples. In some non-limiting embodiments or aspects, a query may be generated based on a geographic location and/or at regular intervals. In this manner, a query can be communicated or triggered by an electronic wallet application based on a current or planned geographic location of the user to determine offers available to the user in that geographic location based on the use or presentation of a portable financial device. As an example, an electronic wallet application may determine that a user is in an airport and the query may return an offer for the user to utilize a private facility, such as an airlines club, available at that location for holders of certain portable financial devices.

The query may return, to the client node, one or more offers available or potentially available to the user based on the specified parameters. The offer may be in the form of a recommended portable financial device of a plurality of portable financial devices associated with that user. The offer may also be in the form of a list of possible offers and/or portable financial devices for the user to choose between. If more than one offer is determined to be available based on the query, and those offers are associated with more than one portable financial device, one or more preference rules may be processed to determine a recommended portable financial device. The preference rule may be processed by a server, one or more nodes, a client application, a mobile device, an electronic wallet application, and/or any other like system or device. A preference rule may include a ranking of reward preference (e.g., discounts preferred to airline miles or points), a ranking of account identifiers (or portable financial devices associated with account identifiers), and/or the like, and may be user-specified or provided by any other entity. A preference rule may also specify other transaction parameters and/or thresholds for determining what portable financial device to recommend, such as a merchant category, a transaction value, and/or the like, such that a ranking of rewards or preferred portable financial devices may change based on the parameters of the transaction.

Figure 2:
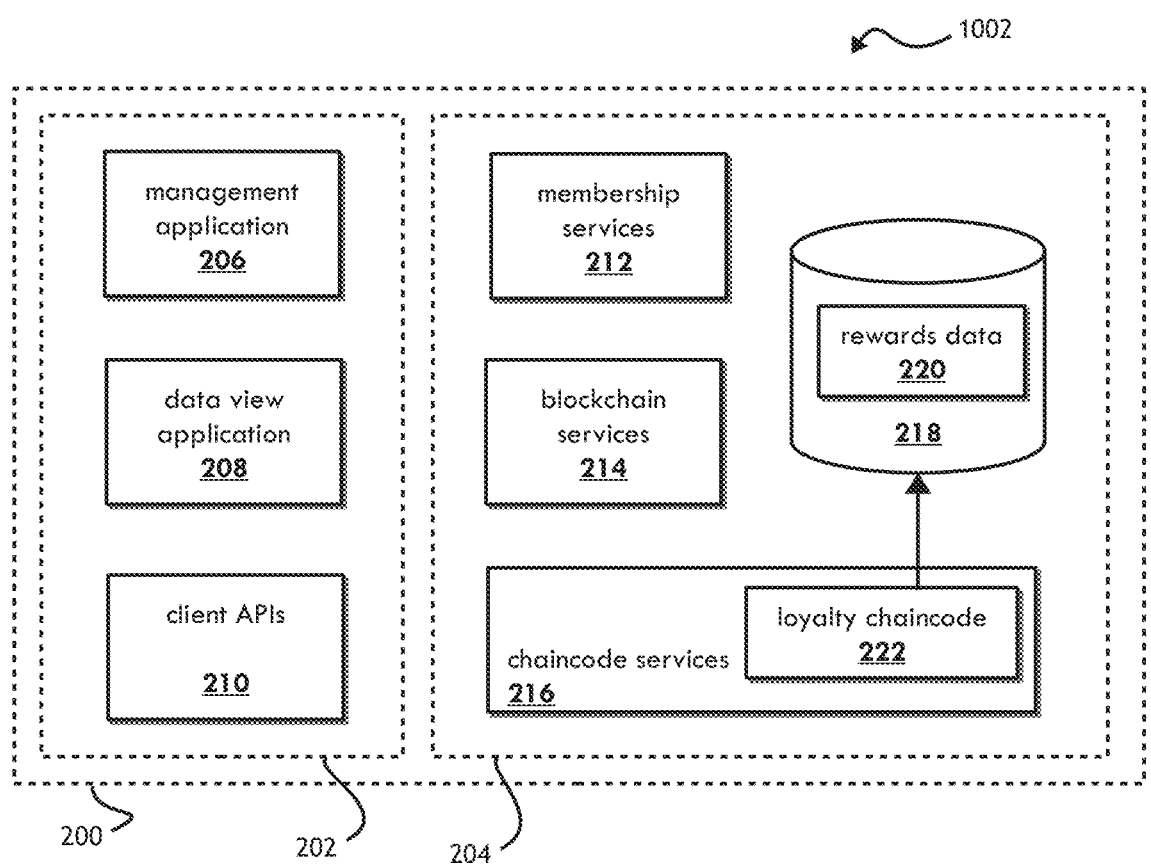
FIG. 2 is a schematic diagram of a system for implementing a blockchain-based rewards network according to some non-limiting embodiments or aspects.

Referring now to FIG. 2, a schematic diagram is shown for a system 1002 for implementing a blockchain-based rewards network according to some non-limiting embodiments or aspects. The system 1002 includes a blockchain architecture 200 with client applications 202 and services 204. The client applications 202 may include any processing logic for interacting with the distributed ledger 218. For example, a management application 206 may facilitate administrative nodes and/or service provider nodes to manage permissions, assign BINs or other entity identifiers to entity nodes, and/or the like. A data view application 208 may facilitate client nodes (or any other node having permission) to query the distributed ledger 218 for rewards data. Client APIs 210 may facilitate merchants and/or electronic wallet providers to provide applications and systems to interface with the system 1002 and to allow for third-party client applications to query the distributed ledger 218, display the results of the query, and/or to take other permissible actions.

Still referring to FIG. 2, the services 204 may include membership services 212, blockchain services 214, and chaincode services 216. It will be appreciated that the services 204 may differ based on how the blockchain network is implemented. For example, implementations using IBM Hyperledger may utilize chaincode services 216 for accessing the distributed ledger 218. A "chaincode," as used herein, may refer to program code that is deployed among nodes of a blockchain network to enable interaction with the distributed ledger 218. Other distributed ledger frameworks may utilize various other applications and services for interacting and enabling interaction with the distributed ledger 218. Membership services 212 may maintain permissions for different participants in the blockchain network. Blockchain services 214 may manage the distributed ledger, the permissions for different participants in the blockchain network, and provide other services relating to managing and maintaining the blockchain network. The distributed ledger 218 in FIG. 2 includes rewards data 220 representing a world state that is mirrored by each of the full nodes maintaining an instance of the distributed ledger 218.

Still referring to FIG. 2, the chaincode services 216 may include a loyalty chaincode 222 for publishing rewards data 220 to the distributed ledger 218 and querying rewards data 220 from the distributed ledger 218. The client applications 202 perform one or more functions with respect to the distributed ledger 218 through the loyalty chaincode 222. The client applications 202 may be executed by client nodes or any other node in the blockchain network. For example, the loyalty chaincode may allow a client application 202 to read rewards data 220 from and/or write rewards data 220 to the distributed ledger 218 based on the permissions available to that client node via membership services 212. A client application 202 may therefore create, update, and/or delete rewards data associated with one or more loyalty programs. A client application 202 may also query the distributed ledger 218 for loyalty programs based on BIN, MCC, a combination of BIN and MCC, geographic location, and/or any other parameters.

In some non-limiting embodiments or aspects, one or more smart contracts may be used to provide services and/or manage permissions in the blockchain network. A smart contract may be coded with logic by a user at an administrative node or any other node, where the logic defines one or more rules for interactions and/or abilities of nodes in the blockchain network. The smart contract is then published to the distributed ledger 218. In some non-limiting embodiments or aspects, smart contracts may be used to enable client applications 202 to interact with the distributed ledger 218.

It will be appreciated that the distributed ledger may comprise any type of data model for structuring the rewards data stored therein. For example, in some non-limiting embodiments or aspects, various tables or objects may be used to structure rewards data. A program table may store rewards data and a user table may store information about users and/or nodes and roles associated with such users and/or nodes, such as permission information. For example, a user or node with an "entity" role may be enabled to create, update, and/or delete rewards data, and a user or node with a "client" or "checkout provider" role may be enabled to query the distributed ledger based on BIN, MCC, geographic location, and/or other parameters. It will be appreciated that certain users or nodes may only have permission to create, update, and/or delete rewards data for certain loyalty programs, such as loyalty programs assigned to or associated with that user or node.

Figure 4:
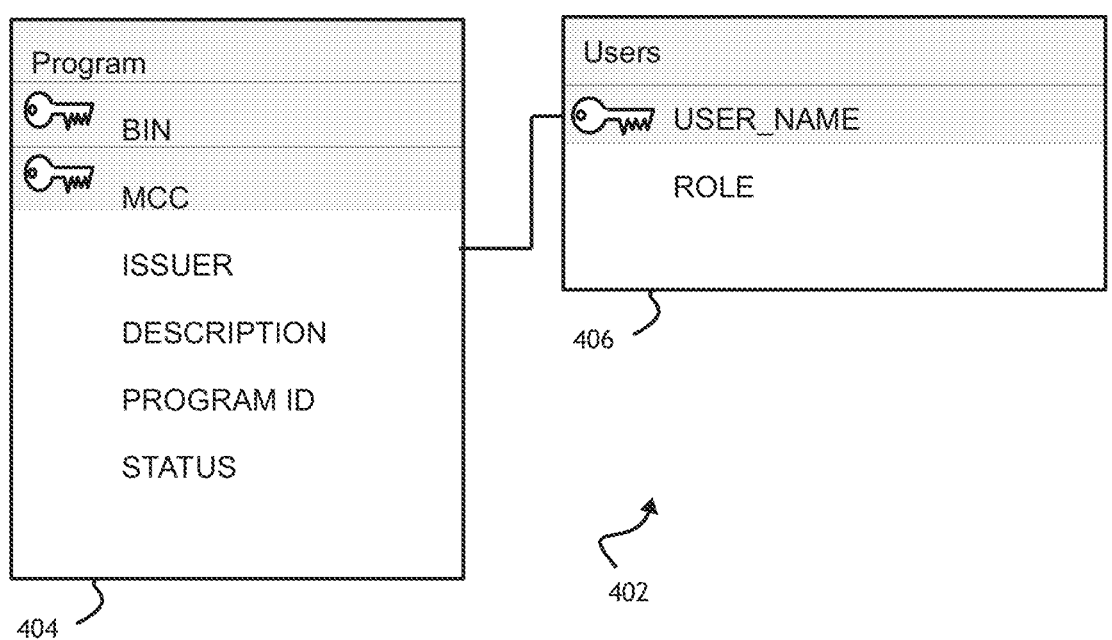
FIG. 4 is a data model for rewards data according to some non-limiting embodiments or aspects.

Referring now to FIG. 4, a data model 402 is shown according to some non-limiting embodiments or aspects. The data model includes a program table 404 and a user table 406. The program table 404 includes rewards data parameters such as BIN, MCC, issuer identifier, loyalty program description, program identifier, and status. The BIN and MCC parameters shown in FIG. 4 are protected parameters, meaning that permission is required to create, modify, or delete the values. The user table 406 includes parameters such as user name and role. It will be appreciated that various other data structures and data models may be used.

Referring now to FIG. 3A, a graphical user interface (GUI) 302 for a client application is shown according to some non-limiting embodiments or aspects. The entity view GUI 302 shown in FIG. 3A may be made available to entity nodes, such as issuer systems. The entity view GUI 302 may provide one or more selectable options 303, 304 for viewing a list of entities, viewing a list of loyalty programs created by each entity, creating a new loyalty program, and updating or deleting an existing loyalty program associated with an entity. The term "selectable option," as used herein, may refer to one or more push buttons, radio buttons, checkboxes, drop-down menus, hyperlinks, selectable text, text boxes, and/or other like elements selectable by a user. The entity view GUI 302 shows a table of rewards data, where each row represents a loyalty program. The columns of the table include different parameters of rewards data, including BINs 305, MCCs 306, entity identifiers 307 (e.g., such as issuer institution names), descriptions of loyalty programs 308, loyalty program identifiers 309 (e.g., such as campaign codes), and statuses 310. A selectable option 304 allows for a user to choose an entity (in this example, an issuer institution) from a list of entities that are viewable by that user based on permissions. Another selectable option 303 allows for a user to create a new loyalty program by displaying a further GUI.

Referring now to FIG. 3B, a loyalty program creation GUI 312 is shown according to some non-limiting embodiments or aspects. The loyalty program creation GUI 312 may be displayed in response to a user selecting a selectable option 303 on the entity view GUI 302. The loyalty program creation GUI 312 includes selectable options for inputting rewards data, including a selectable option 314 for an entity identifier, a selectable option 316 for a BIN, a selectable option 318 for an MCC, a selectable option 320 for a loyalty program identifier, a selectable option 322 for a description of a loyalty program, a selectable option 326 to create a loyalty program based on the inputted data, and a selectable option 324 to close the loyalty program creation GUI 312. It will be appreciated that various selectable options may be presented and that the loyalty program creation GUI 312 may be part of the same GUI or separate from the entity view GUI 302.

Referring now to FIG. 3C, a graphical user interface (GUI) 302 for a client application is shown according to some non-limiting embodiments or aspects. The client view GUI 326 shown in FIG. 3C may be made available to client nodes, such as merchant systems and/or electronic wallet providers. The client view GUI 326 may provide one or more selectable options 328 for viewing a list of clients or other display options. The client view GUI 326 shows a table of rewards data, where each row represents a loyalty program. The columns of the table include BINs 305, MCCs 306, entity identifiers 307 (e.g., such as issuer institution names), descriptions of loyalty programs 308, loyalty program identifiers 309 (e.g., campaign codes), and statuses 310.

Figure 5:
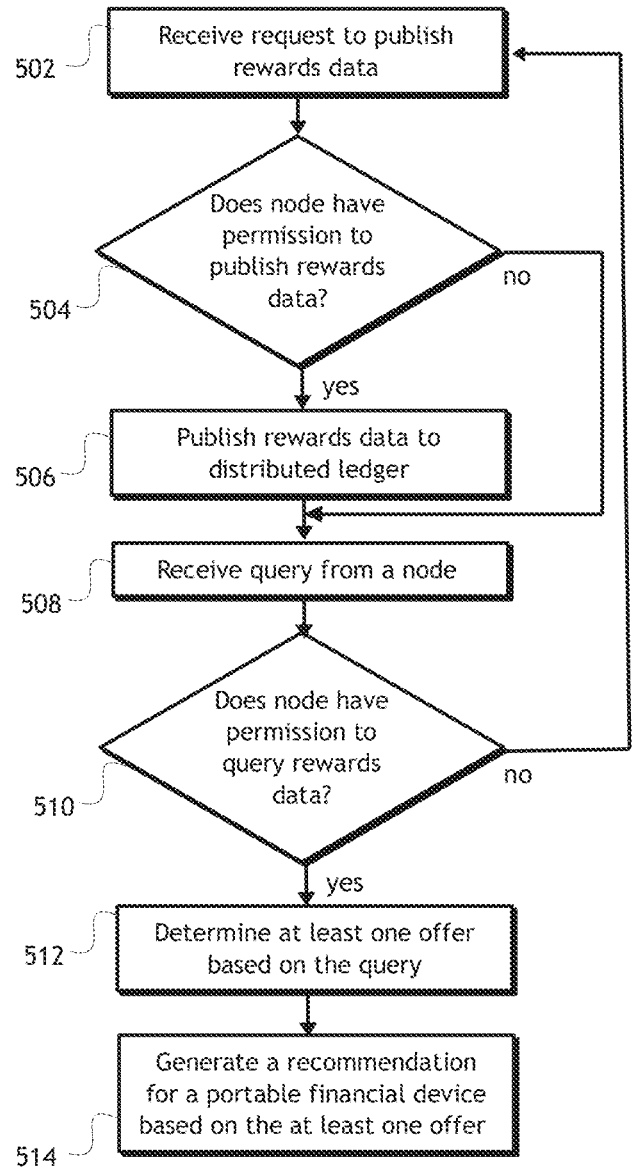
FIG. 5 is a flow diagram of a method for a method of implementing a blockchain-based rewards network according to some non-limiting embodiments or aspects.

Referring now to FIG. 5, a method for implementing a blockchain-based rewards network is shown according to some non-limiting embodiments or aspects. The method shown in FIG. 5 starts with an existing blockchain network including a plurality of nodes, at least a subset of which are full nodes hosting an instance of a distributed ledger. Program instructions, such as client applications and/or a distributed ledger framework, are also deployed to the nodes for enabling interaction with the blockchain network. At a first step 502, a request is received by the blockchain network from a node to publish rewards data (e.g., create, modify, or delete a loyalty program by adding, editing, or deleting one or more parameters of rewards data). The request may be received by one or more other nodes in the blockchain network. At step 504, it is determined whether the node requesting to publish rewards data has permission to do so. For example, a node may have permission to publish any type of rewards data, may have permission to publish rewards data associated with one or more entity identifiers, or may not have permission to publish any type of rewards data. Permissions may be determined by blockchain services hosted by one or more nodes in the blockchain network, such as the nodes designated as full nodes or administrative nodes.

With continued reference to FIG. 5, if the requesting node is determined to have permission at step 504, the method proceeds to step 506 and rewards data is published to the distributed ledger. If the requesting node is determined to not have permission, the method may proceed back to step 502 or advance to step 508 to await a request or query. At step 508, a query is received from a node. The query may include one or more parameters such as, for example, a BIN, BIN range, MCC, merchant identifier, geographic location, and/or the like. The query may also originate from a merchant POS system, an electronic wallet, a user computer, and/or the like. At step 510, it is determined whether the node submitting the query has permission to do so. For example, a node may have permission to query all rewards data, may have permission to query a subset of rewards data (e.g., rewards data associated with one or more specified entities, for example), or may not have permission to submit a query. Permissions may be determined by blockchain services hosted by one or more nodes in the blockchain network, such as the nodes designated as full nodes or administrative nodes.

With continued reference to FIG. 5, if the querying node is determined to have permission at step 510, the method proceeds to step 512 in which the distributed ledger is queried to determine one or more offers that are available to the user based on the parameters included in the query. For example, if the query species a BIN or BIN range and an MCC, it may be determined what offers are available for that BIN or BIN range and MCC combination. As another example, if the query specifies a geographic location, it may be determined what offers are available in that geographic location. At step 514, a recommendation for a portable financial device is generated based on the one or more offers determined to be available at step 512. For example, if more than one offer is determined to be available based on the query, and those offers are associated with more than one portable financial device, one or more preference rules may be processed to determine a recommended portable financial device. As an example, a preference rule may specify that a user prefers maximizing discounts to airline miles and, if a discount and airline miles are available offers for a given transaction, result in the portable financial device associated with the discount being recommended.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:
1. A computer-implemented method, comprising:
displaying, with at least one processor, a graphical user interface (GUI) comprising an entity view GUI and a client view GUI based on rewards data published to a distributed ledger for a blockchain network comprising client nodes and entity nodes, the client nodes comprising a plurality of merchant systems corresponding to a plurality of merchants, the entity nodes comprising a plurality of issuer systems, each issuer system of the plurality of issuer systems comprising at least one authorization server for authorizing a payment transaction, wherein each entity node is associated with an entity identifier of a plurality of entity identifiers, and wherein each entity identifier comprises a bank identification number (BIN) associated with an issuer system of the plurality of issuer systems;
displaying, via the entity view GUI on an issuer system of the plurality of issuer systems, a rewards data table comprising the rewards data organized in a plurality of rows, each row comprising a loyalty program of a plurality of loyalty programs associated with the issuer system, and a first selectable option to modify the plurality of loyalty programs by adding an additional loyalty program to the plurality of loyalty programs associated with the issuer system, wherein each loyalty program of the plurality of loyalty programs is associated with a plurality of parameters and at least one other parameter, the plurality of parameters comprising the entity identifier comprising the BIN associated with the issuer system;

receiving, via the entity view GUI, a first input from the issuer system, the first input comprising data associated with the first selectable option to add the additional loyalty program to the plurality of loyalty programs associated with the issuer system;

modifying, with at least one processor of the issuer system, the rewards data table by creating an additional row to the plurality of rows, the additional row comprising the additional loyalty program associated with the issuer system based on the first input to generate a modified rewards data table comprising modified rewards data, the additional loyalty program associated with the entity identifier comprising the BIN associated with the issuer system;

publishing, with the at least one processor of the issuer system, the modified rewards data table comprising the additional row comprising the additional loyalty program;

displaying, via the entity view GUI on the issuer system, a second selectable option associated with at least one additional parameter of a plurality of parameters for the additional loyalty program;

receiving, via the entity view GUI, a second input from the issuer system, the second input comprising parameter data for the at least one additional parameter of the plurality of parameters associated with the additional loyalty program;

modifying, with the at least one processor of the issuer system, the at least one additional parameter of the plurality of parameters for the additional loyalty program based on the second input to generate a second modified rewards data table;

publishing, with the at least one processor of the issuer system, the second modified rewards data table comprising the parameter data for the at least one additional parameter of the plurality of parameters for the additional loyalty program;

receiving, by a merchant system of the plurality of merchant systems from the issuer system, the entity identifier comprising the BIN associated with the issuer system associated with the additional loyalty program;

querying, via the client view GUI on at least one merchant system, the distributed ledger based on the entity identifier comprising the BIN associated with the issuer system; and displaying, via the client view GUI on the at least one merchant system, the second modified rewards data table comprising the modified rewards data corresponding to the entity identifier comprising the BIN associated with the issuer system.

2. The method of claim 1, wherein the plurality of parameters comprises one or more of: an issuer name associated with the issuer system, a merchant category code, a campaign code, a description, a status, and/or any combination thereof.

3. The method of claim 1, wherein the entity view GUI comprises a plurality of selectable options to modify the rewards data published to the distributed ledger comprising at least an option to delete at least one loyalty program of the plurality of loyalty programs.

4. The method of claim 1, wherein the entity view GUI comprises a drop down menu comprising selectable options to filter the plurality of loyalty programs based on a selected issuer system of the plurality of issuer systems.

5. The method of claim 4, further comprising:
displaying a list of the plurality of issuer systems based on a user selecting the drop down menu;
receiving a selection of the issuer system from the user; and
filtering the rewards data to display the plurality of loyalty programs associated with the selected issuer system.

6. The method of claim 1, wherein separate permissions are maintained for the client nodes and of the entity nodes, the separate permissions comprising a plurality of rules governing access to the distributed ledger.

7. The method of claim 1, wherein the entity view GUI is configured to be accessed only by the entity nodes, and wherein the client view GUI is configured to be accessed only by the client nodes.

8. A system, comprising:
a mobile device comprising at least one processor and memory, the at least one processor programmed or configured to:
display a graphical user interface (GUI) comprising an entity view GUI and a client view GUI based on rewards data published to a distributed ledger for a blockchain network comprising client nodes and entity nodes, the client nodes comprising a plurality of merchant systems corresponding to a plurality of merchants, the entity nodes comprising a plurality of issuer systems, each issuer system of the plurality of issuer systems comprising at least one authorization server for authorizing a payment transaction, wherein each entity node is associated with an entity identifier of a plurality of entity identifiers, and wherein each entity identifier comprises a bank identification number (BIN) associated with an issuer system of the plurality of issuer systems;
display, via the entity view GUI of an issuer system of the plurality of issuer systems, a rewards data table comprising the rewards data organized in a plurality of rows, each row comprising a loyalty program of a plurality of loyalty programs associated with the issuer system, and a first selectable option to modify the plurality of loyalty programs by adding an additional loyalty program to the plurality of loyalty programs associated with the issuer system, wherein each loyalty program of the plurality of loyalty programs is associated with a plurality of parameters and at least one other parameter, the plurality of parameters comprising the entity identifier comprising the BIN associated with the issuer system;
receive, via the entity view GUI, a first input from the issuer system, the first input comprising data associated with the first selectable option to add the additional loyalty program to the plurality of loyalty programs associated with the issuer system;
modify the rewards data table by creating an additional row to the plurality of rows, the additional row comprising the additional loyalty program associated with the issuer system based on the first input to generate a modified rewards data table comprising modified rewards data, the additional loyalty program associated with the entity identifier comprising the BIN associated with the issuer system;
publish the modified rewards data table comprising the additional row comprising the additional loyalty program;
display, via the entity view GUI, a second selectable option associated with at least one additional parameter of the plurality of parameters for the additional loyalty program;
receive, via the entity view GUI, a second input from the issuer system, the second input comprising parameter data for the at least one additional parameter of the plurality of parameters associated with the additional loyalty program;
modify the at least one additional parameter of the plurality of parameters for the additional loyalty program based on the second input to generate a second modified rewards data table;
publish the second modified rewards data table comprising the parameter data for the at least one additional parameter of the plurality of parameters for the additional loyalty program;
receive from the issuer system the entity identifier comprising the BIN associated with the issuer system associated with the additional loyalty program;
query, via the client view GUI of a merchant system of the plurality of merchant systems, the distributed ledger based on the entity identifier comprising the BIN associated with the issuer system; and
display, via the client view GUI, the second modified rewards data table comprising the modified rewards data corresponding to the entity identifier comprising the BIN associated with the issuer system.

9. The system of claim 8, wherein the plurality of parameters comprises one or more of: an issuer name associated with the issuer system, a merchant category code, a campaign code, a description, a status, and/or any combination thereof.

10. The system of claim 8, wherein the entity view GUI comprises a plurality of selectable options to modify the rewards data published to the distributed ledger comprising at least an option to delete at least one loyalty program of the plurality of loyalty programs.

11. The system of claim 8, wherein the entity view GUI comprises a drop down menu comprising selectable options to filter the plurality of loyalty programs based on a selected issuer system of the plurality of issuer systems.

12. The system of claim 11, wherein the at least one processor is further programmed or configured to:
    display a list of the plurality of issuer systems based on a user selecting the drop down menu;
    receive a selection of the issuer system from the user; and
    filter the rewards data to display the plurality of loyalty programs associated with the selected issuer system.

13. The system of claim 8, wherein separate permissions are maintained for the client nodes and the entity nodes, the separate permissions comprising a plurality of rules governing access to the distributed ledger, wherein the entity view GUI is configured to be accessed only by the entity nodes, and wherein the client view GUI is configured to be accessed only by the client nodes.

14. A computer program product, comprising:
   at least one non-transitory computer-readable medium including program instructions that, when executed by at least one processor, cause the at least one processor to:
      display a graphical user interface (GUI) comprising an entity view GUI and a client view GUI based on rewards data published to a distributed ledger for a blockchain network comprising client nodes and entity nodes, the client nodes comprising a plurality of merchant systems corresponding to a plurality of merchants, the entity nodes comprising a plurality of issuer systems, each issuer system of the plurality of issuer systems comprising at least one authorization server for authorizing a payment transaction, wherein each entity node is associated with an entity identifier of a plurality of entity identifiers, and wherein each entity identifier comprises a bank identification number (BIN) associated with an issuer system of the plurality of issuer systems;
      display, via the entity view GUI of an issuer system of the plurality of issuer systems, a rewards data table comprising the rewards data organized in a plurality of rows, each row comprising a loyalty program of a plurality of loyalty programs associated with the issuer system, and a first selectable option to modify the plurality of loyalty programs by adding an additional loyalty program to the plurality of loyalty programs associated with the issuer system, wherein each loyalty program of the plurality of loyalty programs is associated with a plurality of parameters and at least one other parameter, the plurality of parameters comprising the entity identifier comprising the BIN associated with the issuer system;
      receive, via the entity view GUI, a first input from the issuer system, the first input comprising data associated with the first selectable option to add the additional loyalty program to the plurality of loyalty programs associated with the issuer system;
      modify the rewards data table by creating an additional row to the plurality of rows, the additional row comprising the additional loyalty program associated with the issuer system based on the first input to generate a modified rewards data table comprising modified rewards data, the additional loyalty program associated with the entity identifier comprising the BIN associated with the issuer system;
      publish the modified rewards data table comprising the additional row comprising the additional loyalty program;
      display, via the entity view GUI on the issuer system, a second selectable option associated with at least one additional parameter of a plurality of parameters for the additional loyalty program;
      receive, via the entity view GUI, a second input from the issuer system, the second input comprising parameter data for the at least one additional parameter of the plurality of parameters associated with the additional loyalty program;
      modify the at least one additional parameter of the plurality of parameters for the additional loyalty program based on the second input to generate a second modified rewards data table;
      publish the second modified rewards data table comprising the parameter data for the at least one additional parameter of the plurality of parameters for the additional loyalty program;
      receive from the issuer system the entity identifier comprising the BIN associated with the issuer system associated with the additional loyalty program;
      query, via the client view GUI of a merchant system of the plurality of merchant systems, the distributed ledger based on the entity identifier comprising the BIN associated with the issuer system; and display, via the client view GUI, the second modified rewards data table comprising the modified rewards corresponding to the entity identifier comprising the BIN associated with the issuer system.

15. The computer program product of claim 14, wherein the plurality of parameters comprises one or more of: an issuer name associated with the issuer system, a merchant category code, a campaign code, a description, a status, and/or any combination thereof.

16. The computer program product of claim 14, wherein the entity view GUI comprises a plurality of selectable options to modify the rewards data published to the distributed ledger comprising at least an option to delete at least one loyalty program of the plurality of loyalty programs.

17. The computer program product of claim 14, wherein the entity view GUI comprises a drop down menu comprising selectable options to filter the plurality of loyalty programs based on a selected issuer system of the plurality of issuer systems, and wherein the instructions further cause the at least one processor to:

display a list of the plurality of issuer systems based on a user selecting the drop down menu;

receive a selection of the issuer system from the user; and filter the rewards data to display the plurality of loyalty programs associated with the selected issuer system.

* * * * *